UNITED STATES PATENT OFFICE.

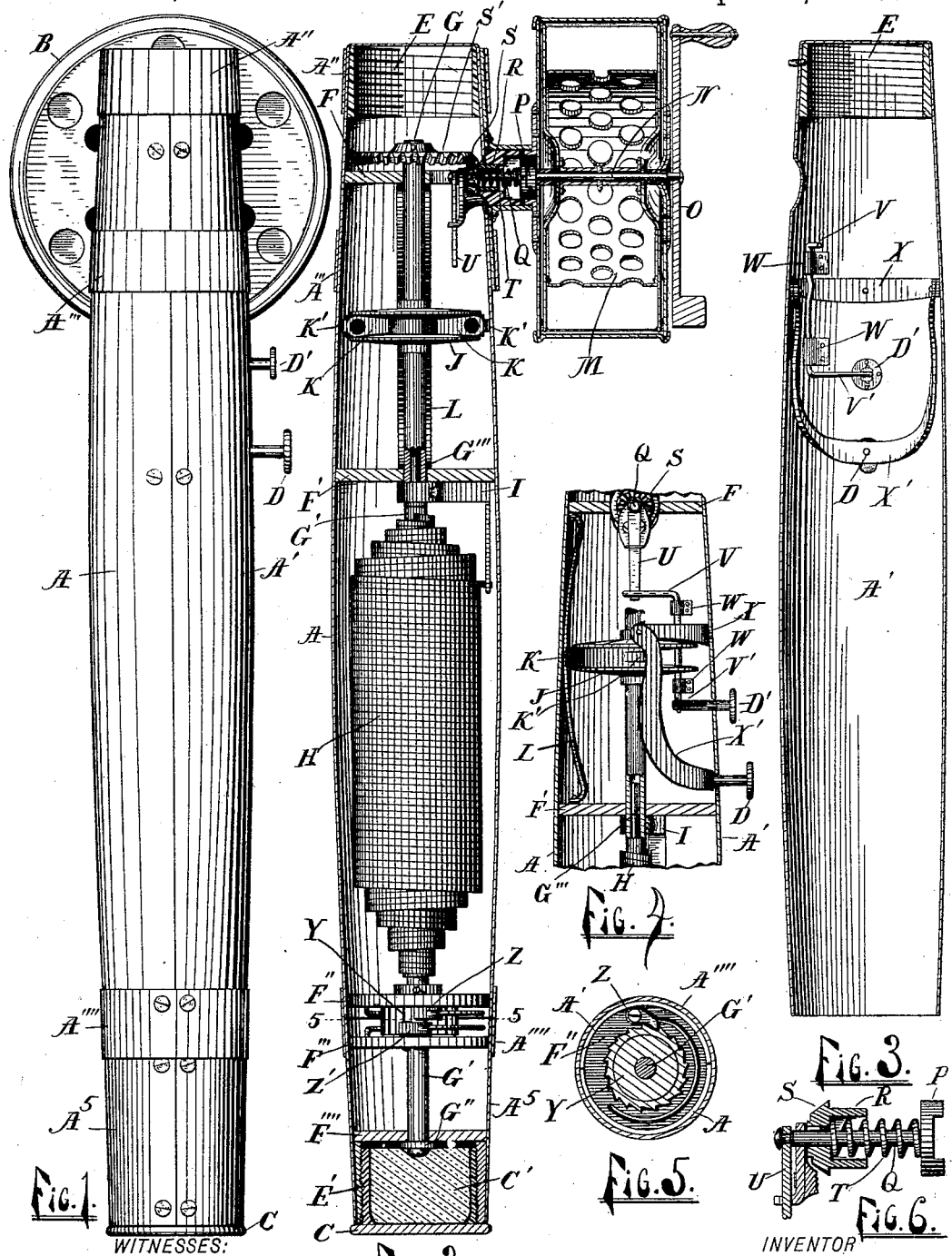

GEORGE H. NEWELL, OF GRAND RAPIDS, MICHIGAN.

FISHING ROD AND REEL.

SPECIFICATION forming part of Letters Patent No. 495,827, dated April 18, 1893.

Application filed October 22, 1892. Serial No. 449,661. (No model.)

*To all whom it may concern:*

Be it known that I, GEORGE H. NEWELL, a citizen of the United States, residing at the city of Grand Rapids, in the county of Kent and State of Michigan, have invented certain new and useful Improvements in Fishing Rods and Reels, of which the following is a specification.

My invention relates to combined fishing rods and reels in which the line is drawn in by a spring when desired instead of using the cranked wheel. And the invention relates to the various parts and combination of parts more particularly shown and described in the specification hereto. And the objects of my invention are:—First: To produce a fishing rod and reel wherein I can wind up by means of a spring, a very large length of line, and whereby I can control the winding of the reel by means of the button levers within reach. Second: To combine with a spring a movable part having suitable ratchet and dog or pawl connections, enabling me to wind up the spring at any time so that the same will operate to wind the reel whenever desired. Third: To provide a means for disconnecting the reel from the operation of the spring, thus allowing the operator to use the reel as a free reel. These objects I accomplish by means of the mechanism illustrated in the accompanying drawings, in which,—

Figure 1 is a side elevation of the butt or hand piece of the fishing rod, which, in the example of my invention illustrated in the drawings, is composed of two parts suitably attached together. Fig. (1) also shows an end view of the fishing reel. Fig. 2 is a vertical sectional view of the butt, showing the inside of one of the halves of the case, which is marked A., and also showing the spring, gearing and connecting parts in position for operation. Fig. 3 shows an inside view of the other half of the butt, or the half which is marked A', and illustrates the lever system by which the friction is relieved so as to allow the spring to operate the reel. It also shows the lever arrangement whereby the reel is detached from the operation of the spring. Fig. 4 is a vertical section of a portion of the butt, showing a side view of a lever connection which operates the friction device, allowing the spring to act upon the gearing, which operates the reel, and also illustrating the lever device and connections which disconnect the reel from the operation of the spring. Fig. 5 is a sectional view on line 5—5, of Fig. (2), showing an end view of the ratchet wheel; and also one pawl, and spring which holds the pawl or dog in operative contact with the ratchet wheel. Fig. 6 shows a sectional view of the pinion wheel, the shaft of the pinion wheel, the lever detaching the pinion-wheel and its connection from the reel, a spring and a part of the clutch upon the shaft which engages with the other part of the clutch upon the shaft of the drum of the reel.

Similar letters refer to similar parts throughout the several views.

A. represents one-half the section of the shell, which forms the main part of the butt of the fishing rod. A' shows the other half.

A'' and A''' are ferrules or ways used in attaching the reel to the fishing rod. A' is also a ferrule attaching together the two parts of the fishing rod, and also attaching to the butt proper the movable section $A^5$; the section $A^5$ can be revolved or oscillated, and is used in connection with the parts connected therewith to wind the spring in a manner hereinafter described.

B. is the cylindrical frame supporting the revolving drum of the reel and other parts.

C. is a cylindrical plug provided with a screw thread E' adapted to engage with the cylinder $A^5$; the plug C may have any suitable filling such as cork or any other light substance, which is shown by C'.

G. is a shaft which is rigidly connected to a (bevel) wheel S'; and G' is a shaft to which one end of the spring H. is attached. The spring H. is what is known as a compound coiled spring having one end attached to the shaft G', and it is then wound in the form of the coil a certain distance and then wound inversely backward and forward so as to obtain a spring of greater length in order to revolve the shaft to which it is attached a great number of times; the outer end of the spring H is attached to an arm rigid with the hub I. It will thus be seen that the compound spring H is composed of a series of integral and concentrically arranged sections and that the outer portion or section has one end connected with the shaft G while the inner portion or section is connected to the shaft G'.

G'' is a washer on the end of the shaft G' and between the support for the shaft, and a screw which attaches the shaft to said support, such support being shown in Fig. (2) by F''''.

G''' is a pintle or coupling, which, in the example of my invention shown in the drawings, is made rigid with the shaft G', and fits into the shaft G, thereby attaching together the shafts G and G' and supporting one end of the shaft G, but allowing the shafts to revolve independently of each other.

In the construction of my invention as shown in the drawings, only the shaft G' is revolved in winding the spring, but in unwinding the same the shaft G alone revolves; its revolution being caused by the connection between the outer end of the spring to the hub I., which hub I is rigid with said shaft G. To the cap $A^5$ is rigidly attached the support F''' and to the support F''' is pivoted a dog Z', and is also fastened a spring shown by 4.

Y is a ratchet wheel which is arranged to be operated upon by the dog Z, and also by the dog Z'. The dog Z is shown in Fig. (5), and the spring 2 in Fig. (5) serves to hold the dog in contact with the ratchet wheel Y. The dog Z is pivoted to support F'', which support F'' is rigid with a part of the case designated by A. and A'. The form of the dog Z' and spring 4 Fig. 2, is precisely the same as the form of the dog Z and spring 2 shown in Fig. (5). The hub I is rigid with the shaft G, and is connected to the outer end of the spring, and the inner end of the spring is attached to the shaft G'.

When the butt $A^5$ is revolved in one direction, it winds the spring H, and the dog Z holds it wound so that by operating the butt or cylinder $A^5$ the spring may be completely wound. This operation is done by either turning the cylinder $A^5$ in one direction, or by moving it backward and forward first in one direction and then in the other, the dog Z' turning the shaft G' so as to wind the spring as the cylinder $A^5$ is turned in one direction and allows the dog to slip over the ratchet when the cylinder $A^5$ is turned in the opposite direction. This description shows one way of winding the spring.

F and F' are supports for the shaft G. At the upper end of the shaft G. there is a bevel wheel S', which is rigid with said shaft G., and which bevel wheel S' engages with and operates the pinion wheel S. The pinion wheel S is attached to one end of short shaft Q, and is provided with a cylindrical portion R, designed to hold in position upon the shaft Q, the coil spring T. The coil spring T bears at one end against a part of the clutch P. and at the other end against an inner shoulder upon the pinion wheel S. The clutch P connects the shaft Q., and the shaft N, which shaft N. supports the drum M, which drum M is adapted to wind up the line.

The spring T holds the clutch P in operative position when not thrown out by lever mechanism hereinafter described.

The pinion S has a groove which fits upon the projections on its shaft. This allows the shaft Q to be moved lengthwise, but still retains it in position to be revolved by pinion S. In order to hold the shaft G. in position, both when the operator is winding up the spring H, and also when the spring H is wound up, I provide a friction mechanism which in the example of my invention shown in the drawings is composed of the grooved pulley J., which is rigid with the shaft G., and a wedge shaped friction brake K'—K' held in frictional contact by means of the spring L., the brake K fitting into the wedge shaped groove in the friction pulley J makes a very strong and effective frictional connection. In order to take off the friction when it is found desirable to wind up the line upon the reel, I have provided a U shaped lever, shown by X'. This U shaped lever is pivoted to a support, and is adapted to lie near to the side of the shell of the butt. A side elevation of this lever is shown in Fig. (4). A button D on the outside of the shell and connected by a suitable neck or shank to the U shaped lever, which enables the operator to press down the free end of the lever, causes the lever at two points near its fulcrums to come in contact on either side of pulley J with the projecting shoulders K'—K'., this depresses the brake K against the action of the spring L. and allows the spring H to exert its utmost force in winding up the line on the reel.

In case the operator desires to use the reel as a free running reel, the same may be entirely disconnected from the operation of the spring, and can be operated by hand through the crank O, which crank O is attached to the shaft N of the drum M. A disconnection is produced by means of the bell-crank lever V, which is pivoted at one end to an inward projection of the button D', at a point shown by V'. This bell-crank shaft lever V is supported in lugs W—W and comes in contact with an arm U., which arm U is attached to the shaft Q., and by pressing downward on the button D', the crank V is revolved bearing against the arm U and opening or disconnecting the clutch P so as to allow the reel to be turned in either direction entirely independent of the mechanism operated by the spring.

Instead of winding the spring H by means of a movable piece $A^5$, the spring may be wound directly by revolving the reel by means of a crank O, (the brake K being pressed out of frictional contact with pulley J) or it may be revolved by unwinding the line from the drum or reel M, and thus the operator has three ways of winding the spring, and when the spring has once been wound, it will of its own motion, wind the line upon the reel, and by unwinding the line from the reel, the parts being properly connected, it will wind the spring. The operation of the reel is continually under the control of the user, inasmuch as the friction connection operated through the lever X' and button D may be so managed as to entirely control the action of the spring.

The reel is ordinarily attached to a pole by means of a screw thread E in one end of the butt piece; but for trout fishing the butt piece may be reversed and, the plug C being withdrawn, the pole may be engaged in the threaded interior of the cylinder $A^5$ thus causing the reel to occupy a position at the extreme end of the fishing pole. The plug C will be engaged with the screw thread E when the butt piece is thus reversed.

It will be observed that in the construction described the shaft G is revolved by the unwinding of the spring in the same direction as the shaft G' is turned in winding it. It will be further observed that by my construction it is not necessary to use any cross shaft within the cylindrical butt, thus allowing for the use of a large bevel wheel, and for leaving an entirely smooth pole when the reel is removed inasmuch as the connecting shaft and pinion and other parts are all contained within the hub of the reel.

Having thus described my invention, what I claim to have invented, and desire to secure by Letters Patent, is—

1. The combination with a fishing rod having a cylindrical butt and a reel, of the independently rotatable shafts G G' arranged in line with each other within the butt, a compound coiled spring located within the butt and composed of a series of integral concentrically arranged sections the outer portion of which is connected at one end with the shaft G and the inner portion of which spring is attached at its outer end to the shaft G', gearing connecting one of said shafts with the reel and mechanism for rotating or oscillating the other shaft to wind the spring, substantially as described.

2. The combination with a fishing rod, a hollow cylindrical butt piece and a reel located outside the butt piece, of the shafts G and G' arranged in line with each other within the butt, bevel gearing connecting the shaft G with the reel shaft, a compound coiled spring having the outer section or portion of one end connected with said shaft G and the inner portion or section of the outer end attached to the shaft G', a movable portion or cap $A^5$ mounted on the butt, and a ratchet mechanism connecting said movable portion with the shaft G' to wind the spring, substantially as described.

3. In combination with a fishing rod, a movable cylindrical portion as $A^5$ carrying the dog adapted to engage with a ratchet, a shaft as G' provided with a ratchet as Y., said ratchet rigidly attached to said shaft G', a dog as Z adapted to retain said shaft and spring in position, when wound or partially wound, the spring attached at its inner end to said shaft, a secondary shaft as G, suitably connected to the outer end of said spring, a bevel wheel as S' located within the butt or shell, a pinion and suitable connection between said pinion and the reel, substantially as described.

4. The combination with a fishing rod, a cylindrical butt or shell, a reel, the shaft G geared with said reel, and a spring located within the butt and adapted to revolve said shaft, of a pulley rigidly mounted on said shaft, a friction brake having projecting shoulders, a spring for holding said brake in engagement with the pulley, and a two armed lever having a projecting button where it may be engaged with said shoulders to release or take off the brake, substantially as described.

5. The combination of a reel, the clutch whereby the reel may be connected or disconnected with the operative parts within the butt of the fishing rod, a spring adapted to hold said clutch in operative position, a shaft supporting a portion of said clutch at one end, and a pinion at the other, a bevel wheel within said butt, and suitable mechanism for disconnecting said clutch, substantially as described.

6. In a fishing rod a cylindrical butt, a shaft having a ratchet wheel attached thereto, a shaft, a dog or pawl engaged with said ratchet and attached to a disk, a movable section rigid with said disk, a disk and dog attached to the stationary part of the butt, a spring adapted to be wound by said movable part, and suitable mechanism for carrying the movement caused by the unwinding of the spring to the reel.

7. The combination of a hollow butt, a reel, a compound spring located within said butt, a shaft connected to the outer portion of said spring at one end, a shaft to which the inner portion of the other end of said spring is attached, a pintle or coupling connecting the two shafts, gearing connecting one of said shafts with the reel, and means for actuating the other shaft to wind the spring, substantially as described.

8. The combination with a fishing rod, a reel and a hollow butt, of the shaft G having a rigid hub provided with the arm I, the compound spring H having an outer portion or section connected with said arm, the shaft G' to which the inner portion or section of said spring is attached, gearing connecting the shaft G with the reel, and mechanism for actuating the shaft G' to wind the spring, substantially as described.

9. The combination of a fishing rod, a hollow butt, a reel located outside the butt, a spring actuated shaft located in the butt, clutch gearing connecting said shaft with the reel shaft, and lever mechanism for disconnecting or unclutching the reel shaft to permit the reel to be turned in either direction independent of its spring actuating mechanism, substantially as described.

In witness whereof I have hereunto set my hand and seal in the presence of of two witnesses.

GEORGE H. NEWELL. [L. S.]

Witnesses:
EDWIN TAGGART,
D. O. SPROAT.